US008755402B2

(12) United States Patent
Gopalakrishnan

(10) Patent No.: US 8,755,402 B2
(45) Date of Patent: Jun. 17, 2014

(54) MEDIUM RESERVATION PROTOCOL FOR DIRECTIONAL WIRELESS NETWORKS

(75) Inventor: Praveen Gopalakrishnan, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 449 days.

(21) Appl. No.: 12/380,614

(22) Filed: Mar. 2, 2009

(65) Prior Publication Data
US 2010/0220699 A1 Sep. 2, 2010

(51) Int. Cl.
H04B 7/212 (2006.01)

(52) U.S. Cl.
USPC .......................................... 370/443

(58) Field of Classification Search
None
See application file for complete search history.

(56) References Cited

U.S. PATENT DOCUMENTS

| 7,321,580 | B1* | 1/2008 | Ramanathan et al. | 370/339 |
|---|---|---|---|---|
| 2004/0047319 | A1* | 3/2004 | Elg | 370/338 |
| 2005/0254513 | A1* | 11/2005 | Cave et al. | 370/445 |
| 2005/0285803 | A1* | 12/2005 | Iacono et al. | 343/702 |
| 2006/0209772 | A1* | 9/2006 | Fang et al. | 370/338 |
| 2007/0258431 | A1* | 11/2007 | Shin et al. | 370/345 |
| 2008/0095095 | A1* | 4/2008 | Adachi et al. | 370/315 |
| 2009/0109938 | A1* | 4/2009 | Singh et al. | 370/337 |
| 2009/0232109 | A1* | 9/2009 | Nandagopalan et al. | 370/336 |
| 2010/0014489 | A1* | 1/2010 | Qin et al. | 370/336 |
| 2010/0014502 | A1* | 1/2010 | Singh et al. | 370/343 |
| 2010/0172296 | A1* | 7/2010 | Singh et al. | 370/328 |
| 2010/0220690 | A1* | 9/2010 | Majkowski et al. | 370/336 |

OTHER PUBLICATIONS

U.S. Appl. No. 12/215,157, filed Jun. 25, 2008.

* cited by examiner

Primary Examiner — Anh-Vu Ly
(74) Attorney, Agent, or Firm — Sutherland Asbill & Brennan LLP

(57) ABSTRACT

Two wireless communications devices in a wireless network may reserve a period of time for directional data communications between themselves during a Contention Access Period. The technique may include transmitting Clear-to-Send messages to each other, and to any other devices with which either has established a directional link, to prevent interfering transmissions from these other devices. Other devices that have not established a directional link with either of these two may overhear the CTS messages and also refrain from transmitting interfering signals during the reserved time period.

13 Claims, 5 Drawing Sheets

MEDIUM RESERVATION PROTOCOL FOR DIRECTIONAL WIRELESS NETWORKS

BACKGROUND

Some wireless networks that are designed to operate in highly congested environments, such as those that operate in the 60 GHz band, may try to reduce inter-device interference by using directional transmissions and receptions between pairs of devices for much of the communications. Once established, in many cases such links may operate without the need for the network controller to schedule every communication. However, this ad hoc scheduling by the various devices in the network can create communications problems of its own. A single device may have separate directional links with multiple other devices, but may not be able to transmit on one link while receiving on another link, and may not be able to receive on one link while focusing its directional receiver on another link. Without a central controller to schedule all communications in a way that prevents these conflicts, interference between devices can easily occur, causing at least some of the communications to fail. Conventional techniques for avoiding interference in a shared medium are not adequate, as these techniques generally only allow for one transmitter in the network at a time. This defeats one of the major advantages of directional links, which is that different links between different device pairs may operate simultaneously without interfering with each other.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
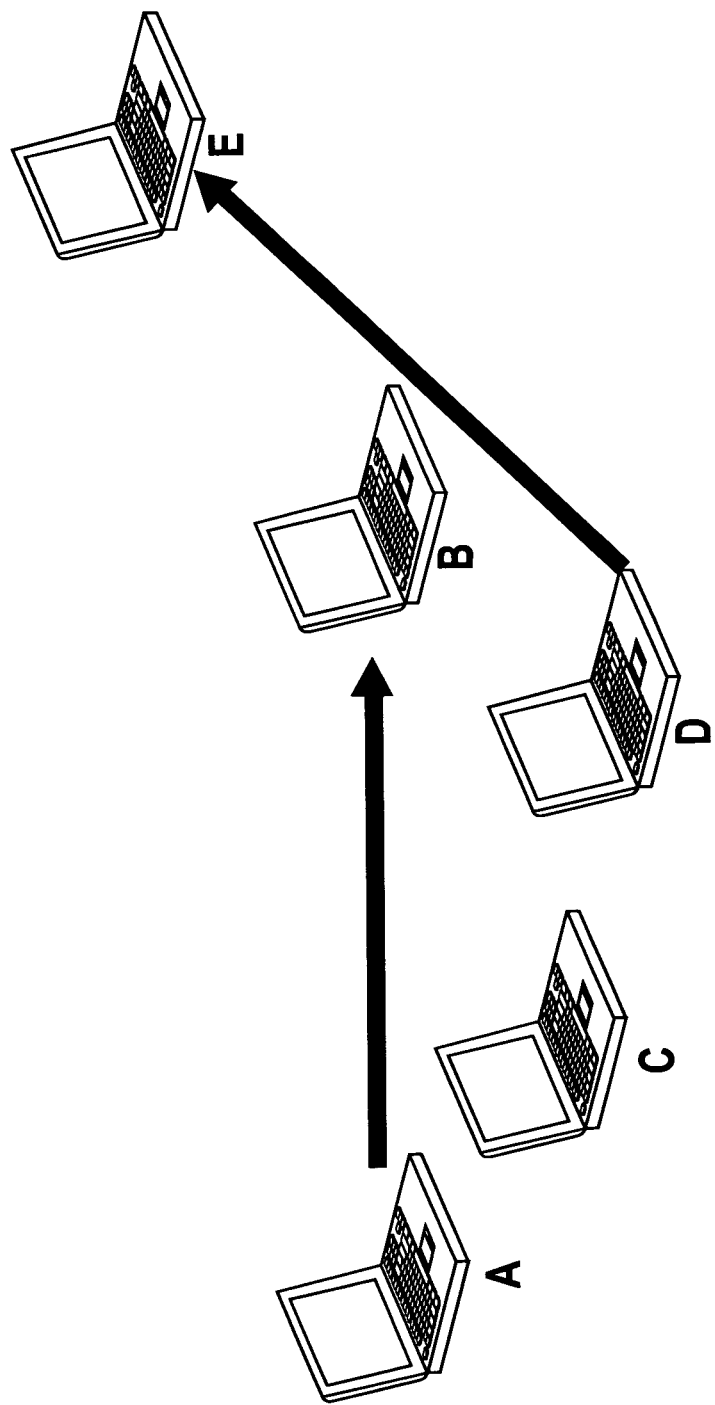
FIG. 1 shows a wireless network of directional nodes, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, or in ranking.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers, such as but not limited to read only memory (ROM); random access memory (RAM); magnetic disk storage media; optical storage media; flash memory, etc.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not.

Many of the terms used in this document, such as request-to-send, clear-to-send, network allocation vector, contention access period, etc., are used in the examples because these terms are already in common usage in particular network technologies, and are therefore easily comprehended by those of ordinary skill in the art. However, the functional concepts represented by the terms may be easily applied to technologies that use other terminology, and the embodiments of the invention are intended to cover these other technologies and other terminology.

FIG. 1 shows a wireless network of directional nodes, according to an embodiment of the invention. In the illustrated example, the network contains five wireless devices, labeled A, B, C, D, and E. Although any of these devices might be designated as the network controller, for this example all five may be considered as peer devices for the limited communications exchanges described. For simplicity of illustration, each device is shown as a notebook computer, but in reality each node may be represented by one of any number of wireless devices, such as but not limited to a portable computer, a printer, an internet router, a keyboard, a display, a music system, a television, a storage device, etc. Each device may include a processor, a memory, multiple antennas, and a radio that can process different signals to be transmitted through the different antennas in a manner that results in directional transmission. In some embodiments the radio may also process different signals that were received through the different antennas in a manner that results in directional reception.

A directional transmission means the transmission is relatively strong in one direction and relatively weak in the other directions, within the intended frequency band. A directional reception means the receiving device can receive signals from one direction more readily than it can receive equivalent strength signals from other directions, within the intended frequency band. By contrast, omnidirectional transmissions transmit a signal of approximately equal strength in all 360 degrees of direction in the same frequency band, while with omnidirectional receptions, equal-strength signals in the same frequency band from all 360 degrees of direction are received with approximately equal strength. Various techniques are known for creating directional transmissions and receptions, with some involving multiple antennas on each device.

To communicate directionally with each other, two devices may establish a directional link with each other, in which each device transmits toward the other device directionally, and in some cases each device receives directionally from the other device. A single device may have a separate directional link with each of multiple other devices. Although a device may not be able to communicate over two different directional links at the same time, quickly switching from one link to another allows directional communication with multiple devices to occur effectively and at high speeds. This may be particularly advantageous when a receiver is listening to multiple links for possible incoming transmissions. By scanning the links (rapidly and repeatedly switching the receiver from one link to the next), a device may effectively monitor several different links until it detects an incoming signal that justifies stopping the scan and decoding the signal.

In some embodiments, the signal processing parameters necessary to establish a particular directional link with another device may be determined through a training procedure with the other device. Once established, these parameters may be repeatedly used until something about the link changes that necessitates retraining (e.g., one of the devices either rotates or is moved to a different location). An advantage of such parameter-based directional communications is that the direction may be changed from one link to another very quickly by simply changing the processing parameters, parameters which may have already been determined through previous training. Since each device may not need to communicate with every other device in the network, directional links only need to be established between device pairs that are likely to need such directional communication. When a device has established a directional link with each of one or more other devices, those other devices are known as the communicating set (CS) for that device. In some embodiments, a device may listen for possible transmissions from every device in its CS by rapidly switching from one link to the next. When it detects a certain amount of energy in the received signal, it may stop and decode the incoming signal on that link.

Figure 2:
FIG. 2 shows a superframe for a wireless network, according to an embodiment of the invention.

FIG. 2 shows a superframe for a wireless network, according to an embodiment of the invention. A superframe may occur at regular intervals (e.g., every 5 milliseconds), and contain multiple frames. In the illustrated example, the superframe comprises a beacon, a contention access period (CAP), and a contention-free period (CFP). The beacon may be transmitted by the network controller and be used for various purposes, such as to announce the presence of the network, synchronize the clocks of the different devices, and schedule some of the communications that will take place later during the superframe. The CAP may be used for devices to communicate in a manner that is unscheduled by the network controller. Since these communications are unscheduled, each device may have to contend for access to the communications medium. The CFP may be used for scheduled communications between devices in the network, with the schedule having been established by the network controller and announced during the beacon.

Figure 3:
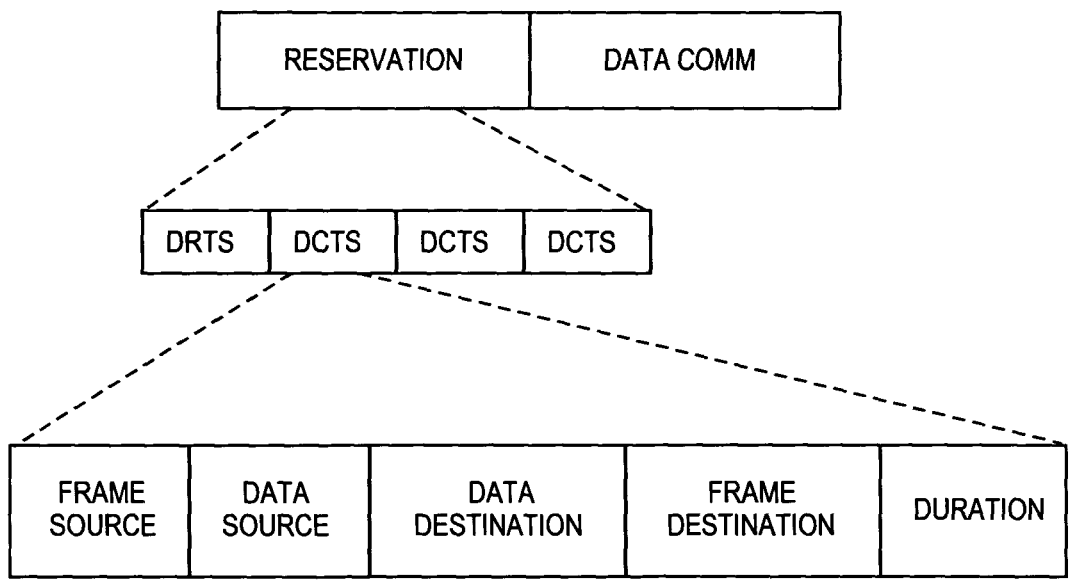
FIG. 3 shows a protocol for reserving a time for communicating data over a directional link during a CAP, according to an embodiment of the invention.

FIG. 3 shows a protocol for reserving a time for communicating data over a directional link during a CAP, according to an embodiment of the invention. The first line of FIG. 3 shows a reservation frame, followed by a data communications frame. In some embodiments, the data communications frame follows closely behind the reservation frame so that no other communications may take place between the two frames. The reservation frame may be used to reserve the time period of the data communications frame, during which two devices may communicate data with each other over their directional link. The purpose of the reservation is to prevent other devices from interfering with this data communication, by making it known that those other devices should not engage in their own communications during the reserved period under circumstances that might create such interference. In some embodiments, the reservation frame contains a directionally-transmitted Request to Send (DRTS) message and one or more directionally-transmitted Clear-to-Send (DCTS) messages, as shown on the second line of FIG. 3. Such DRTS and DCTS messages may comprise any suitable format, such as but not limited to the formats described in IEEE standards 802.11.

The third line of FIG. 3 shows some of the contents of a DCTS messages, according to an embodiment of the invention. In some embodiments, the DRTS may also contain the same fields shown for the DCTS message. These fields include four fields to identify devices that may be involved in, or affected by, the data communication, and a fifth field to specify the duration of the data communication period. The Frame Source field identifies the device sending this reservation message, while the Frame Destination field identifies the device intended to receive this reservation message. The Data Source field identifies the device that will be considered the source device during the data communications frame, while the Data Destination field identifies the device that will be considered the destination device during the data communication frame. The Duration field indicates when the data communication frame will end, either by indicating a duration of time or by indicating a point in time, in a manner that will be understood by the other devices in the network. For convenience of illustration, these fields are shown consecutively in a particular order, but other embodiments may include these fields in any feasible order, whether consecutive or not. The described communications may be used in a sequence involving a modified version of a virtual carrier sensing protocol, in which a device uses carrier sensing to determine when the medium is idle, and then initiates an RTS/CTS exchange to reserve the medium for a certain amount of time for the actual data communication. In some embodiments, carrier sensing is used before transmitting the DRTS. In other embodiments, carrier sensing may also be used before transmitting one or more of the other DCTS's described herein. If carrier sensing determines that the medium is busy, the device can wait for a period of time (back off period) before sensing again. If the medium is not busy, then the device can transmit the DRTS. In some embodiments the back off time period is derived somewhat randomly, by randomly selecting from among different time periods. This random approach may help avoid situations in which two different devices sense a busy medium at the same time, wait for the same back off period, and try to sense again at the same time, perpetuating a continuing stalemate.

The reservation frame may comprise a sequence comprising a DRTS followed by multiple DCTS's, transmitted by various devices. Since these may each be transmitted at a different time, the Duration field in each one may be adjusted so that all will indicate the same end point for the data communications frame. In a typical example, a first device wishing to communicate with a second device may transmit a DRTS to the second device. The second device may then respond with a DCTS to the first device to accept the request, and the first device may transmit a DCTS back to the second device to acknowledge the acceptance. The first and second devices may then transmit a DCTS to each of the other devices in their communicating sets (CS's) so that those other devices will refrain from transmitting to the first or second devices during the data communications frame. Any other devices that are able to receive any of the DCTS's may also refrain from transmitting to the first or second devices during the data communications frame.

Figure 4:
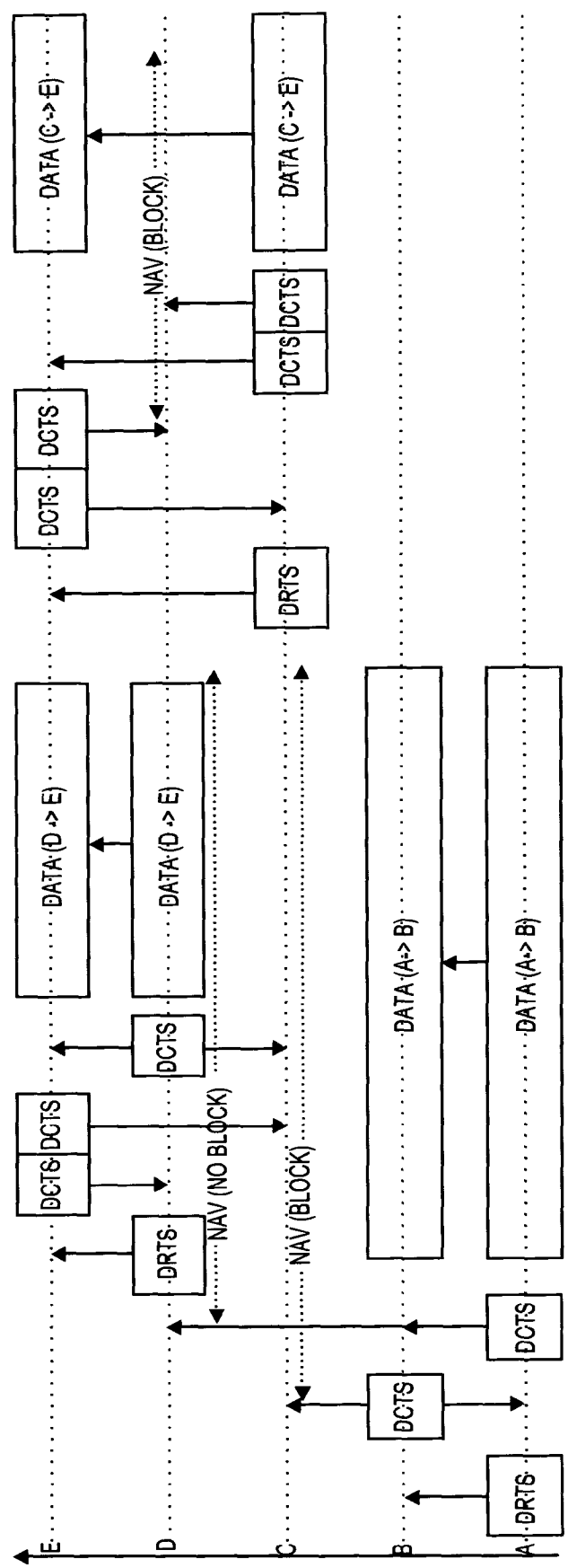
FIG. 4 shows a timing diagram of an example of communications in a wireless network, according to an embodiment of the invention.

FIG. 4 shows a timing diagram of an example of communications in a wireless network, according to an embodiment of the invention. The horizontal axis represents the passage of time, while the vertical axis represents activities by each of the five network devices A, B, C, D, and E (see FIG. 1). For this example, it may be assumed that each device has the following communicating set shown in brackets: A:[B], B:[A], C:[D,E], D:[C,E], E:[C,D]. In other words, directional links have been established between A:B, C:D, C:E, and D:E, and all the following transmissions take place over some of these directional links.

In the illustrated example, device A wishes to initiate a data communication with device B, and indicates this by transmitting a DRTS to device B with the Duration field indicating the period of time for which device A wants the medium is to be reserved. If device B is able to accommodate this schedule (e.g., it doesn't already have other communications scheduled during the reservation period), then it can accept this request by transmitting a DCTS to device A. Since the DCTS was transmitted later than the DRTS, the Duration field in this DCTS may be shorter than the original duration indicated in the DRTS, so that both durations will end at the same time. (The subsequent DCTS's will also shorten the indicated duration, so that all DCTS's will indicate durations that end at the same time.)

In some embodiments, each device receiving a DCTS in the described sequence will set its Network Allocation Vector (NAV) for the indicated duration, so that it will refrain from making certain transmissions during the data communications frame. Devices A and B, since they are making this reservation, will only transmit to each other during the data communications frame, but not to any other devices. The other devices that receive a DCTS will set their NAV to refrain from transmitting to devices A and B during the data communications frame. A Blocking NAV (B-NAV) will prevent the device from transmitting to any device during the data communications frame, while a Non-Blocking NAV (NB-NAV) will prevent the device from transmitting to devices A and B but permit it to transmit to other devices in its CS during the data communications frame. In some embodiments, a DRTS will not cause any device to set its NAV, so the DCTS's may be used for this purpose.

When device A receives the DCTS from device B, it can transmit its own DCTS back to device B, thus completing the agreement between devices A and B to communicate with each other during the data communications frame. This agreement may include an implied agreement that devices A and B will not transmit to other devices during the data communications frame. Although devices A and B have reserved a data communications period for themselves, there may be other devices in the network that need to be told not to transmit an interfering signal during the reserved time period. These other devices may be placed in two categories: 1) devices in the CS's of devices A and B, and 2) devices that are not in the CS's of either device A or B, but which nonetheless might be able to interfere with communications between devices A and B. To handle the devices in the CS's of devices A and B, devices A and B may transmit a DCTS to every other device in its CS. In this particular example, devices A and B only have each other in their CS's, and they have already exchanged DCTS's with each other, so this extra step need not be performed. However, it would be performed if either device A or device B had one or more of devices C, D, and E in its CS.

Depending on the physical location of the various devices in the network, there may be other network devices that are not in A and B's CS, but which have the potential to cause interference for A and/or B during the reserved communications period. In general, these devices can determine this by listening for the DCTS transmissions from A and/or B. If their receiver can detect the DCTS transmission, then their transmitter might be able to cause interference. In this example, it is assumed that device C 'overhears' the DCTS (receives the DCTS even though the DCTS wasn't addressed to it) that was transmitted from device B to device A, and device C sets its NAV accordingly so that it won't make an interfering transmission. It is further assumed that device D overhears the DCTS transmitted from device A to device B and sets its NAV accordingly so that it won't make an interfering transmission. The remaining question for each is whether it should be a B-NAV or a NB-NAV. In some embodiments, a B-NAV is set when the Data Source address in the DCTS is the same as the Frame Destination address, and a NB-NAV is set for any other device combination.

In this example, the following address assignments would be made in the various DRTS and DCTS transmissions:

DRTS from node A to node B: Frame Source and Data Source=node A, Data Destination and Frame Destination=node B. Since the DRTS does not trigger a NAV, this combination has no effect on the type of NAV.

DCTS from node B to node A (also overheard by node C): Frame Source and Data Destination=node B, Frame Destination and Data Source=node A. Since the Data Source is the same as the Frame Destination, this would trigger a B-NAV in node C when it overheard this DCTS.

DCTS from node A to node B (also overheard by node D): Frame Source and Data Source=node A, Data Destination and Frame Destination=node B. Since the Data Source is not the same as the Frame Destination, this would trigger a NB-NAV in node D, which overheard this DCTS.

Thus node C will refrain from transmitting to any node during the data communications frame, while node D will refrain from transmitting to nodes A or B during the data communications frame, but may transmit to devices C or E during that time.

An example is shown in FIG. 4 of node D reserving a data communications frame with node E while node D is in a NB-NAV status. In this example, node D transmits a DRTS to node E, node E transmits a DCTS back to node D, and node D then transmits a DCTS back to node E. This reserves their subsequent data communications period with each other, but does not notify node C of the reservation. Since node C is in the CS for both node D and node E, it needs to be informed of the reservation so it will not try to transmit to either during that period. Therefore at least one of node D and node E transmits a DCTS to node C.

In the illustrated embodiment, node D and node E each transmit a DCTS to node C. This is relatively easy to implement since it involves a simple rule that both the Data Source and Data Destination devices will transmit a DCTS to every device in their respective CS. However, it adds a redundant transmission to the overall network traffic since only one of these DCTS's is needed to inform node C. In other embodiments, only one device (either the Data Source or the Data Destination device) will transmit the DCTS to each device that they share in their CS's. While this approach eliminates the redundant DCTS, it is more complicated to implement since it requires that Data Source and Data Destination devices share information on which devices are in their respective CS's, and that they have some type of rule to decide which one will refrain from transmitting the DCTS to each CS device that they share.

In this particular example, node C could not transmit to nodes D or E anyway, since it is under a B-NAV condition that was previously triggered by nodes A and B, but nodes D and E may be unaware of that restriction on node C, and communicate their DCTS's to node C anyway. It is also worth noting that the data communications frame for nodes D and E ends no later than the end of the data communications frame for nodes A and B. In some embodiments, an NB-NAV status in a device carries a restriction that any communication initiated by the device during the NB-NAV must end no later than the NB-NAV ends.

FIG. 4 also shows another communication sequence, initiated by node C, that takes places after the previous NAV periods have ended. In this sequence, node C (the Data Source) transmits a DRTS to node E (the Data Destination), which returns a DCTS to node C, which responds with another DCTS to node E. Since nodes C, D, and E are in each other's CS's, nodes C and E each also transmit a DCTS to node D, which will trigger a NAV in node D. Neither of these two DCTS's to node D has the Data Source (node C) equal to the Frame Destination (node D), so the NAV will be an NB-NAV based on these two DCTS's. However, node D may overhear the DCTS from node E to node C. In that DCTS, Frame Destination node C equals Data Source node C, which triggers the illustrated B-NAV in node D. When a device receives conflicting directions on whether its NAV should be blocking or non-blocking, the blocking condition should prevail.

In some embodiments of the various situations described above, the Data Source (DS) device will not transmit a DRTS or a DCTS to the Data Destination (DD) device until the DS device determines the medium is not busy and its NAV status permits a transmission to the DD device. Similarly, in some embodiments the DD device will not transmit a DCTS to the DS device until the DD device determines the medium is not busy and its NAV status permits a transmission to the DS device.

Figure 5:
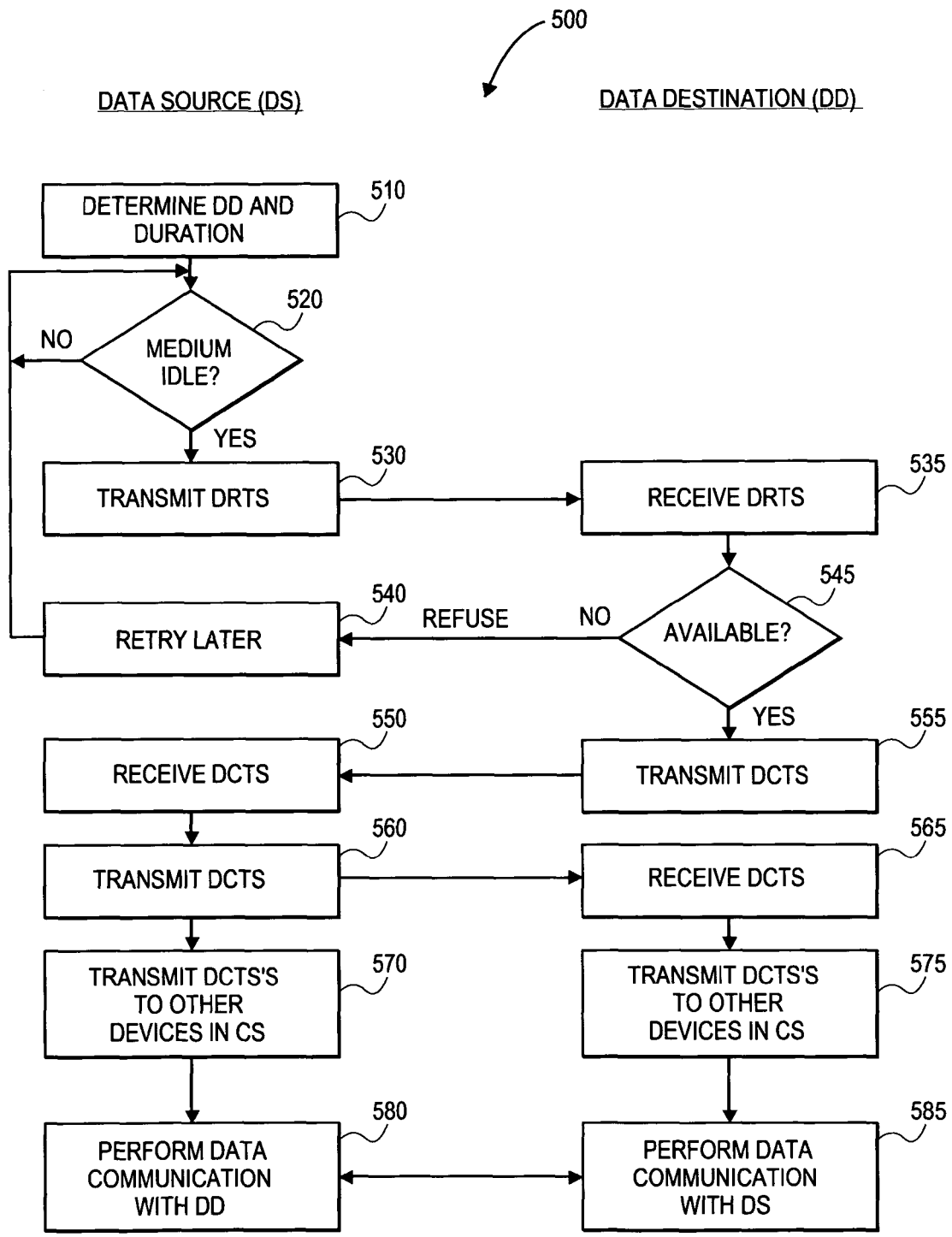
FIG. 5 shows a flow diagram of a method for two wireless communications devices to establish a reservation for subsequent data communications between themselves, according to an embodiment of the invention.

FIG. 5 shows a flow diagram of a method for two wireless communications devices to establish a reservation for subsequent data communications between themselves, according to an embodiment of the invention. These two devices may correspond to the Data Source (DS) and Data Destination (DD) devices described previously for FIG. 3B. In flow diagram 500, at 510 the DS device may determine that it needs to communicate data to the DD device, and when that period of data communication should end. Various criteria may be used to determine these two factors. In particular, the period that the data communications should end may be based on things such as, but not limited to, 1) the amount of data to transmit, 2) the data rate to be used, 3) the amount of contiguous time predicted to be available during the current CAP of the current superframe, 4) the amount of difficulty anticipated in establishing the reservation, 5) the ease with which the data to be communicated can be split among separate superframes, 6) the time-critical nature of the data, 7) the maximum amount of contiguous time allowed for a single reservation, 8) etc. Based on these and/or other factors, the end-point of the requested data communications can be indicated by the Duration value.

After composing the relevant information into a Request-to-Send format, the DS device may sense the medium at 520 until in determines that the medium is idle, at which point it may directionally transmit the DRTS to the DD device at 530. In some embodiments, if the medium is busy for an extended period of time, the DS device may reduce the Duration value to account for the reduced amount of time available in the current CAP, or it may simply abort the attempt and retry at a later time. When the DD device receives the DRTS at 535, it may then determine if it can comply with the request. One such factor in this determination might be to determine if it will be unavailable because it already has a communication planned during the requested time. There may also be other factors that would make it undesirable to accept the request. Regardless of the reason, if the DD device determines at 545 that it won't accept the requested reservation, it can transit a refusal to the DS device, and at 540 the DS device can simply retry the request at a later time. Although not shown, if the DS device does not receive any response from the DD device, the DS device can perform any of various recovery procedures, such as aborting, retrying, etc.

However, if the DD device decides at 545 to accept the request from the DS device, the DD device may transmit a DCTS to the DS device at 555, with the Duration field reduced so that it will indicate the same end point for the data communications frame that was indicated in the DRTS. All the DCTS's in this flow diagram may have their Duration values reduced in this manner, so that they will all indicate the same end point for the communications frame. When the DS device receives this DCTS from the DD device at 550, the DS device may transmit a DCTS back to the DD device at 560, which the DD device receives at 565.

Although the DS and DD devices may have agreed on their subsequent communications schedule at this point, the other devices in their CS's need to be notified as well. So the DS device may transmit a DCTS to each of the other devices in its CS at 570, and the DD device may transmit a DCTS to each of the other devices in its CS at 575. The DS and DD devices may then start their data communications with each other during the reserved data communications frame at 580 and 585. In some embodiments, the data communications during this time period may consist mostly of the DS device transmitting data to the DD device, and the DD device returning an ACK for each piece of data received correctly. However, in other embodiments the DD device may be permitted to transmit significant amounts of data to the DS device as well.

Figure 6:
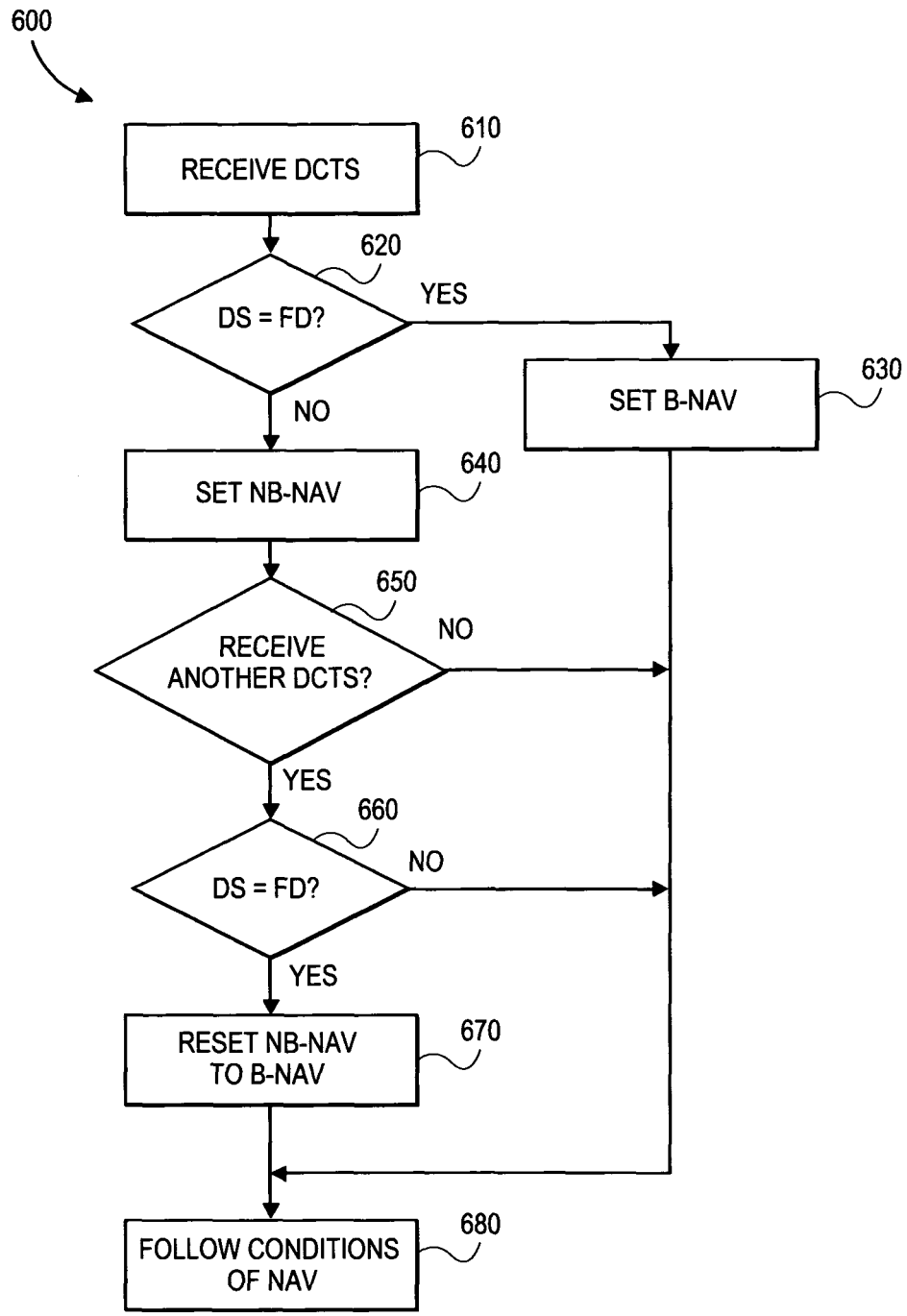
FIG. 6 shows a flow diagram of a method for a wireless communications device to respond when it receives one or more directional clear-to-send messages from the devices of FIG. 5, according to an embodiment of the invention.

FIG. 6 shows a flow diagram of a method for a wireless communications device to respond when it receives one or more directional clear-to-send messages, according to an embodiment of the invention. Such devices may be in the CS for a Data Source or Data Destination device, or may simply overhear a transmission from a Data Source or Data Destination device. For FIG. 6, when a device 'receives' a DCTS, it may receive the DCTS because the DCTS was addressed to it, or because it overheard a DCTS that was addressed to another device. Transmissions can be overheard in this manner if, for instance, a first device happened to be located in the transmission beam from a second device to a third device, and if the first device's receiver is listening in that direction. In flow diagram 600, the wireless communications device may receive a DCTS at 610, and set its NAV according to the Duration field in the DCTS. If the DCTS indicates at 620 that the Data Source (DS) device is the same as the Frame Destination (FD) device, then the NAV may be set as a Blocking-NAV at 630. If these two devices are not indicated as the same device, then the NAV may be set as a Non-Blocking NAV at 640.

It is possible that the device performing the method of FIG. 6 may receive more than one DCTS, from different devices, as determined at 650. If so, if any of these DCTS's show the DS and FD devices as the same device, then the NAV will be set to a B-NAV. If none of the received DCTS's show the DS and FD devices as the same device, the NAV may be a NB-NAV. Operations 650-660-670 show the possibility of multiple DCTS's being received in this manner. Although not shown, if the device receives direction from multiple devices to set its NAV to end at different times, the latest end time may be used. Multiple NAV values may be stored and used by the device to assure it complies with the most stringent requirement at every point during the NAV period. Regardless of how the status of the NAV is set, at 680 the device will follow the conditions of that NAV status for the period of time indicated by the NAV, by refraining from transmitting to the indicated devices during that time.

In many instances, the techniques described herein may work best when both the transmitter and the receiver are directionally tuned for the directional link between them. However, a directional receiver requires antenna training, just as the directional transmitter does, and also requires additional resources in the receiving device to process the received signal directionally. This may be particularly burdensome when the receiver is trying to rapidly scan several directional links. In some cases the overhead requirements of directional receiving may not be justified by the resultant advantages for the device or the network. In such cases, one or more devices may receive signals omnidirectionally for some or all of the described communications. In particular, a device may monitor for incoming signals omnidirectionally, and may switch to directional reception when a definite signal is known to be coming from a particular device.

Due to the inherent nature of wireless communications, no scheme can guarantee that a reservation attempt will always be successful. An unsuccessful reservation attempt could occur because the Data Destination device did not successfully receive the DRTS. An apparently completed reservation sequence might fail because a 'hidden node' did not hear the DCTS's and subsequently transmitted an interfering signal during the data communication frame. Various techniques may be used to reduce the impact of these situations. Such techniques might include the following:

1) If the DS device does not receive a DCTS in response to its DRTS after a fixed number of retries, it may abort the attempt for a predetermined period of time, or until it finally receives a DCTS from the DD device.

2) If a receiver is the target of hidden node interference, and can determine the direction of that interference, it may transmit a DCTS in the direction of the interference.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
transmitting a directional request-to-send (DRTS) to a first wireless communications device;
receiving, from the first wireless communications device, a first directional clear-to-send (DCTS), the first DCTS comprising a first duration field to indicate a time period for subsequent communications, first and second device fields to indicate two devices to participate in the subsequent communications, a third device field to indicate a device transmitting the first DCTS, and a fourth device field to indicate a device to whom the first DCTS is addressed;
transmitting, to a second wireless device, a second DCTS, the second DCTS comprising a second duration field to indicate the time period for the subsequent communications, wherein the subsequent communications is to be between the first wireless communications device and a wireless communications device that transmitted the DRTS, wherein the second DCTS causes the second wireless device to set an indication not to transmit to any device during the time period if the second DCTS indicates that a device to whom the second DCTS is addressed is also a data source device in the subsequent communications; and
transmitting a third DCTS to a third wireless communications device over a previously established directional link;
wherein said receiving and said transmitting are performed during a contention access period over a wireless communications medium through at least one directional link.

2. A method, comprising:
receiving a directional clear-to-send (DCTS) over a directional wireless communications link, the DCTS including a duration field to indicate a time period for subsequent communications, first and second device fields to indicate two devices to participate in the subsequent communications, a third device field to indicate a device transmitting the DCTS, and a fourth device field to indicate a device to whom the DCTS is addressed; and
setting a network allocation vector (NAV) in response to said receiving the DCTS;
wherein the NAV indicates not to transmit to the first and second devices during the time period and further indicates not to transmit to any device during the time period if the DCTS indicates that the device to whom the DCTS is addressed is also a data source device in the subsequent communications.

3. The method of claim 2, wherein said receiving and said subsequent communications occur during a contention access period.

4. An apparatus, comprising:
at least one memory of a first wireless communications device that stores computer-executable instructions; and
at least one processor of the first wireless communications device configured to access the at least one memory, wherein the at least one processor is configured to execute the computer-executable instructions to:
communicate in a wireless communications network using directional transmissions during a contention access period;
transmit a directional request-to-send (DRTS) to a second wireless communications device;
receive, from the second wireless communications device, a first directional clear-to-send (DCTS), the first DCTS comprising a first duration field to indicate a time period for subsequent communications during the contention access period, first and second device fields to indicate two devices to participate in the subsequent communications, a third device field to indicate a device transmitting the first DCTS, and a fourth device field to indicate a device to whom the first DCTS is addressed; and transmit, to the second wireless communications device, a second DCTS, the second DCTS comprising a second duration field to indicate the time period for the subsequent communications, wherein the subsequent communications is to be between the first and second wireless communications devices, wherein the second DCTS causes the second wireless device to set an indication not to transmit to any device during the time period if the second DCTS indicates that a device to whom the second DCTS is addressed is also a data source device in the subsequent communications.

5. The apparatus of claim 4, wherein the at least one processor of the first wireless communications device is further configured to execute the computer-executable instructions to transmit the second DCTS to a third wireless communications device.

6. The apparatus of claim 4, wherein the at least one processor of the first wireless communications device is further configured to execute the computer-executable instructions to transmit a DCTS to every wireless communications device with which it has a directional communications link, each DCTS to comprise the duration field indicating the time period for the subsequent communications.

7. An apparatus, comprising:
at least one memory of a first wireless communications device that stores computer-executable instructions; and
at least one processor of the first wireless communications device configured to access the at least one memory, wherein the at least one processor of is configured to execute the computer-executable instructions to:
   receive a directional clear-to-send (DCTS) over a directional wireless communications link, the DCTS including a duration field to indicate a time period for subsequent communications, first and second device fields to indicate two devices to participate in the subsequent communications, a third device field to indicate a device transmitting the DCTS, and a fourth device field to indicate a device to whom the DCTS is addressed; and
   set a network allocation vector (NAV) in response to said receiving the DCTS;
wherein the first wireless communications device is not to be one of the devices indicated in the first and second device fields; and
wherein the NAV is to indicate not to transmit to the devices indicated in the first and second device fields during the time period for subsequent communications and is to further indicate not to transmit to any device during the time period if the DCTS indicates that the device to whom the DCTS is addressed is also a data source device in the subsequent communications.

8. The apparatus of claim 7, wherein said receiving and said subsequent communications are to occur during a contention access period.

9. An article of manufacture comprising a non-transitory computer-readable medium that contains computer executable instructions, which when executed by one or more processors result in performing operations comprising:
   transmitting a directional request-to-send (DRTS) to a first wireless communications device;
   receiving a first directional clear-to-send (DCTS) from the first wireless communications device, the first DCTS comprising a first duration field to indicate a time period for subsequent communications, first and second device fields to indicate two devices to participate in the subsequent communications, a third device field to indicate a device transmitting the first DCTS, and a fourth device field to indicate a device to whom the first DCTS is addressed;
   transmitting a second DCTS to the first wireless communications device, the second DCTS comprising a second duration field to indicate the time period for the subsequent communications, wherein the subsequent communications is to be between the first wireless communications device and a wireless communications device that transmitted the DRTS, wherein the second DCTS causes the first wireless device to set an indication not to transmit to any device during the time period if the second DCTS indicates that a device to whom the second DCTS is addressed is also a data source device in the subsequent communications; and
   transmitting a third DCTS to a third wireless communications device over a previously established directional link;
wherein said receiving and said transmitting are performed during a contention access period over a wireless communications medium through at least one directional link.

10. The article of claim 9, wherein the operations comprise receiving the first DCTS from a first wireless communications device and transmitting the second DCTS to a second wireless communications device.

11. An article of manufacture comprising a non-transitory computer-readable medium that contains computer executable instructions, which when executed by one or more processors result in performing operations comprising:
   receiving a directional clear-to-send (DCTS) over a directional wireless communications link, the DCTS including a duration field to indicate a time period for subsequent communications, first and second device fields to indicate two devices to participate in the subsequent communications, a third device field to indicate a device transmitting the DCTS, and a fourth device field to indicate a device to whom the DCTS is addressed; and
   setting a network allocation vector (NAV) in response to said receiving the DCTS;
wherein the NAV indicates not to transmit to the first and second devices during the time period and further indicates not to transmit to any device during the time period if the DCTS indicates that a device to whom the DCTS is addressed is also a data source device in the subsequent communications.

12. The article of claim 11, wherein the operation of receiving and the operation of subsequent communications each occur during a same contention access period.

13. A method, comprising:
   transmitting a directional request-to-send (DRTS) to a first wireless communications device;
   receiving, from the first wireless device, a first directional clear-to-send (DCTS), the first DCTS comprising a first duration field to indicate a time period for subsequent communications, first and second device fields to indicate two devices to participate in the subsequent communications, a third device field to indicate a device transmitting the first DCTS, and a fourth device field to indicate a device to whom the first DCTS is addressed; and
   transmitting, to the first wireless device, a second DCTS, the second DCTS comprising a second duration field to indicate the time period for the subsequent communications, wherein the second DCTS causes the first wireless device to set an indication not to transmit to any device during the time period if the second DCTS indicates that a device to whom the second DCTS is addressed is also a data source device in the subsequent communications;
wherein said receiving and said transmitting are performed during a contention access period over a wireless communications medium through at least one directional link and the subsequent communications is to be between the first wireless communications device and a wireless communications device that transmitted the DRTS.

\* \* \* \* \*